US010148652B2

(12) United States Patent
Frelon et al.

(10) Patent No.: US 10,148,652 B2
(45) Date of Patent: Dec. 4, 2018

(54) METHOD FOR CONTROLLING ACCESS TO DATA RELATING TO AN ELECTRICAL INSTALLATION, ASSOCIATED COMPUTER PROGRAMME AND INFORMATION MEDIUM

(71) Applicant: Schneider Electric Industries SAS, Rueil-Malmaison (FR)

(72) Inventors: Benoit Frelon, Brie et Angonnes (FR); Michael Pyle, Hermitage, TN (US)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 158 days.

(21) Appl. No.: 15/174,024

(22) Filed: Jun. 6, 2016

(65) Prior Publication Data
US 2016/0366132 A1 Dec. 15, 2016

(30) Foreign Application Priority Data

Jun. 10, 2015 (FR) ..................................... 15 55286

(51) Int. Cl.
*G06F 7/04* (2006.01)
*H04L 29/06* (2006.01)
(Continued)

(52) U.S. Cl.
CPC ...... *H04L 63/0876* (2013.01); *G01R 19/2513* (2013.01); *H04L 12/2825* (2013.01);
(Continued)

(58) Field of Classification Search
CPC ............. H04L 61/6022; H04L 63/0876; H04L 12/2825; H04L 63/107; H04L 67/125; G01R 19/2513
(Continued)

(56) References Cited

U.S. PATENT DOCUMENTS

2001/0056544 A1* 12/2001 Walker .................... B60R 25/02
726/2
2007/0112961 A1* 5/2007 Brun ..................... H04L 63/102
709/227
(Continued)

FOREIGN PATENT DOCUMENTS

EP          1 868 355 A1      12/2007
KR          10-1469010         12/2014
WO       WO 2012/092625 A2    7/2012

OTHER PUBLICATIONS

French Preliminary Search Report dated Apr. 15, 2016 in French Application 15 55286, filed on Jun. 10, 2015 ( with English Translation of Categories of Cited Documents).

*Primary Examiner* — Gary S Gracia
(74) *Attorney, Agent, or Firm* — Oblon, McClelland, Maier & Neustadt, L.L.P.

(57) ABSTRACT

A controlling access to data exchanged between a management unit of a respective electrical installation and a relay platform, each management unit has a first identifier which is linked to a global network by a gateway having a second identifier between each management unit and the platform, for each frame, obtaining the first identifier, receiving the platform of a request to access the data exchanged, the request including an access parameter and a third identifier of an element originating the transmission of the request, determining the first identifier on which the access parameter depends, comparing the third identifier with the second identifier exchanged by the management unit having the first determined identifier, authorizing access, for the communication terminal, to the data exchanged by the management unit having the first determined identifier, if, in the comparison step, the second and third identifiers are identical.

8 Claims, 3 Drawing Sheets

(51) Int. Cl.
  *H04L 29/08* (2006.01)
  *G01R 19/25* (2006.01)
  *H04L 12/28* (2006.01)
  *H04L 29/12* (2006.01)
  *G06F 15/16* (2006.01)
(52) U.S. Cl.
  CPC ........ H04L 61/6022 (2013.01); H04L 63/107 (2013.01); H04L 67/125 (2013.01)
(58) Field of Classification Search
  USPC ....... 726/4; 455/414.1, 435.1, 411; 370/230, 370/236.2, 241.1, 395.2
  See application file for complete search history.

(56) References Cited

U.S. PATENT DOCUMENTS

| | | | |
|---|---|---|---|
| 2008/0045187 A1* | 2/2008 | Sicart | H04L 29/12009 455/414.1 |
| 2009/0138679 A1* | 5/2009 | Koch, III | G06F 9/264 712/205 |
| 2010/0046417 A1* | 2/2010 | Tamura | H04B 7/155 370/315 |
| 2012/0087300 A1* | 4/2012 | Seok | H04W 76/02 370/315 |
| 2013/0077529 A1* | 3/2013 | Lueckenhoff | H04L 67/16 370/255 |
| 2013/0077558 A1* | 3/2013 | Ukita | H04W 16/26 370/315 |
| 2013/0181839 A1* | 7/2013 | Cao | G06Q 10/087 340/572.1 |
| 2013/0235792 A1* | 9/2013 | Abraham | H04W 88/04 370/315 |
| 2014/0058806 A1* | 2/2014 | Guenette | G05B 15/02 705/14.1 |
| 2014/0075189 A1* | 3/2014 | Abraham | H04W 88/08 713/168 |
| 2014/0355534 A1* | 12/2014 | Vermani | H04W 16/14 370/329 |
| 2015/0249645 A1* | 9/2015 | Sobel | H04L 63/0281 726/12 |
| 2015/0312230 A1* | 10/2015 | Choi | H04L 12/2803 713/171 |

\* cited by examiner

METHOD FOR CONTROLLING ACCESS TO DATA RELATING TO AN ELECTRICAL INSTALLATION, ASSOCIATED COMPUTER PROGRAMME AND INFORMATION MEDIUM

The present invention relates to a method for controlling access to data relating to at least one electrical installation. The invention also relates to a computer program product and an information medium which are associated with such a control method.

The invention lies in the field of data control systems. More precisely, there is control of access by a user of an electrical installation to data relating to the electrical installation from a communication terminal.

Systems are known in which the data are exchanged between a management unit and a relay platform. By way of example, the data are data relating to the electrical energy consumption of the electrical installation. Thus, the data exchanged between the management unit and the relay platform are private data, access to which has to be controlled.

In such control systems, the relay platform belongs to a global network, while the management unit belongs to a local network and is connected to the relay platform and to the global network via a communication gateway, such as a router.

The global network is a network which differs from the local network in that it covers a large geographical area, typically on the scale of a country, of a continent, or indeed of the entire planet, while the local network covers an area on a relatively restricted geographical scale, for example a computer room, a private residence, a building or a company site.

The global network is an Internet network, while the local network is a computer network such that the terminals which belong to the local network have frames dispatched at the level of the link layer without using Internet access.

The management unit is generally configured to regularly transmit to the relay platform, via the communication gateway, the data relating to the electrical installation. The relay platform stores the data and associates with the data an identifier specific to the management unit that transmitted the data.

The user is able to access the data stored by the relay platform and relating to the electrical installation, by transmitting to the relay platform, from the communication terminal, a request to access the data comprising the specific identifier of the electrical installation's management unit.

However, when the user of the electrical installation changes, whilst the communication gateway and the management unit remain associated with the electrical installation, a risk exists that the former user continues to have access to the data relating to the electrical installation. The security of the confidential data is not guaranteed in such a system.

A need therefore exists to improve the control of access to the data exchanged between an electrical installation's management unit and a relay platform and which are stored by the relay platform.

For this purpose, the invention relates to a method for controlling access to data relating to at least one electrical installation, exchanged between a respective management unit of each electrical installation and a relay platform, the relay platform belonging to a global communication network and each management unit belonging to a respective local communication network, each management unit having a first respective identifier, each management unit being linked to the global communication network by a respective communication gateway having a second identifier on the global communication network, characterized in that the method comprises the following steps:

the exchanging of at least one frame between each management unit and the relay platform, each frame comprising the data and the second identifier of the communication gateway through which the frame travels, the obtaining for each frame exchanged of the first identifier of the management unit exchanging the frame, the reception by the relay platform of a request to access the data exchanged with the or one of the management units, the request originating from a communication terminal and comprising an access parameter dependent on the first identifier of the management unit and a third identifier, on the global network, of an element belonging to the global network and being the originator of the transmission of the request on the global network, the determination of the first identifier on which the access parameter depends, the comparison of the third identifier with the second identifier included in the or at least one of the frames exchanged by the management unit having the first determined identifier, the authorization of access, for the communication terminal, to the data included in each frame exchanged by the management unit having the first determined identifier, if, in the comparison step, the second and third identifiers are identical.

According to advantageous aspects of the invention, the control method comprises one or more of the following characteristics, taken in isolation or according to any technically admissible combination:

the method comprises for each management unit the following step:
the launching of a respective temporal counter from a respective reference instant,
and, during the authorization step, access to the data included in each frame exchanged by the management unit having the first determined identifier is also authorized to the communication terminal, if the value of the temporal counter of the management unit having the first determined identifier is less than or equal to a predetermined maximum value, the launching step is carried out just once for each management unit and subsequent to the first iteration of the exchanging step for the management unit, if during the comparison step the second and third identifiers are identical, the method comprises the following step:
the reinitialization to a predetermined initial value of the temporal counter of the management unit having the first determined identifier, the temporal counter recommencing at the predetermined initial value and the predetermined initial value being strictly less than the maximum value, during the exchanging step, each frame comprises the first identifier of the management unit exchanging the frame, during the comparison step, only the second identifier included in the most recent frame exchanged by the management unit having the first determined identifier, is compared with the third identifier, subsequent to the exchanging step, the method comprises
for each frame the following steps:
the storage of the data exchanged,
the association of the first identifier of the management unit exchanging the frame with the stored data,
and, during the authorization step, the data to which access is authorized are the stored data associated with the first determined identifier,
each first identifier is a MAC address and each second and third identifier is an IP address.

The invention relates furthermore to a computer program product comprising software instructions, the software instructions implementing a method such as described previously, when the software instructions are executed by a computer.

The invention also relates to an information medium on which a computer program product such as described previously is stored.

The invention will be better understood and other advantages of the invention will be more clearly apparent in the light of the detailed description which follows, given solely by way of nonlimiting example and with reference to the appended figures in which.

Figure 1:
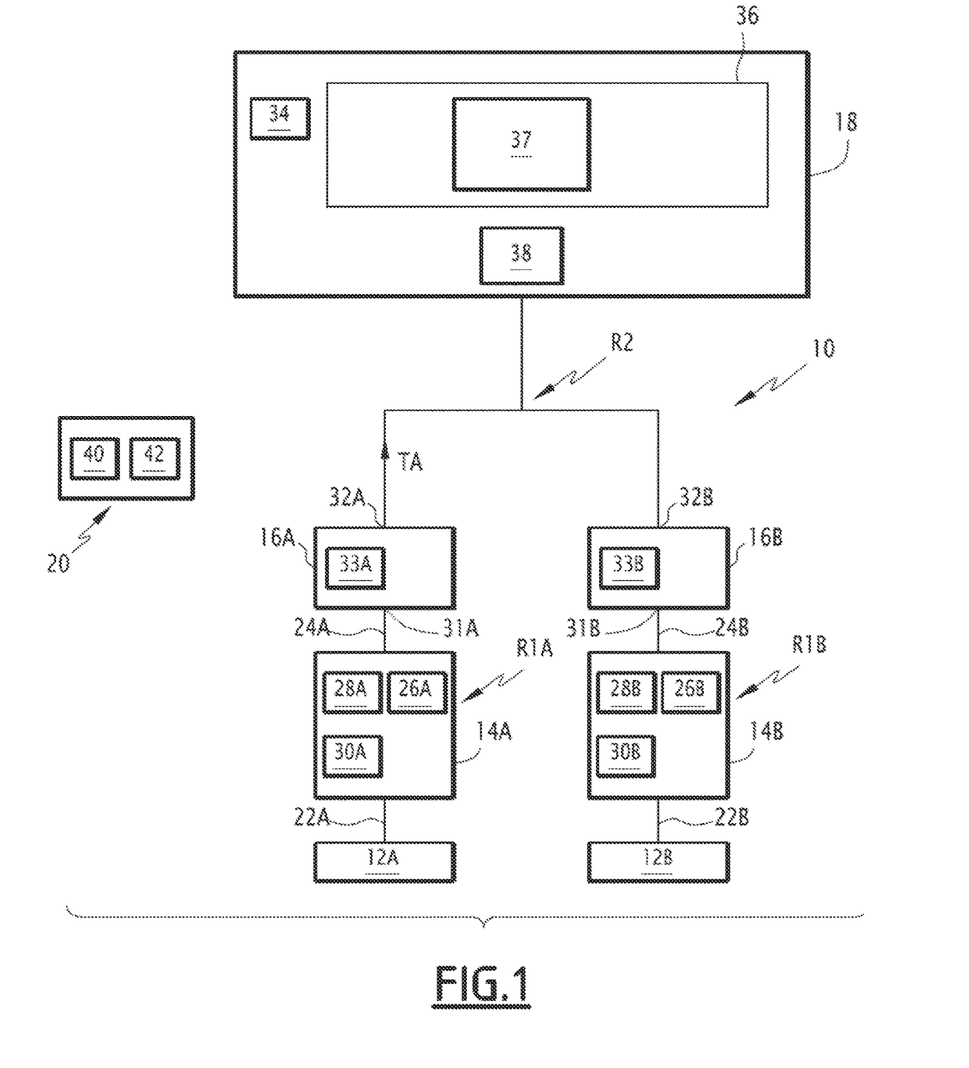
FIG. 1 is a schematic representation of a system for controlling access to data relating to two electrical installations, the system being in accordance with a first embodiment and comprising a management unit of each electrical installation and a relay platform between which the data are exchanged.

A system 10 for controlling access to data DA and DB relating to two electrical installations 12A and 12B is illustrated in FIG. 1.

In the subsequent description, the letters A and B, when they are present in the reference signs, designate two globally identical distinct elements, which are distinguished one from the other by the use of the terms "first" and "second".

The control system 10 comprises, for each electrical installation 12A, 12B, a first 14A respectively second 14B management unit and a first 16A respectively second 16B communication gateway.

The control system also comprises a relay platform 18 and a communication terminal 20.

Each electrical installation 12A, 12B is, for example, a home-automation installation.

Each electrical installation 12A, 12B comprises electrical equipment, such as an alarm system and/or electric shutters and/or lighting systems and/or electro-domestic appliances and/or industrial electrical machines and/or energy meters, and/or presence and/or fire detectors and/or home automation systems.

Hereinafter, only the first management unit 14A is described, the same remarks applying for the second management unit 14B. Likewise, only the communication gateway 16A is described, the same remarks applying for the second communication gateway 16B. The first 14A and second 14B management units, just like the first 16A and second 16B communication gateways 14A are identical and comprise the same elements, which bear the same references, in which the letter B replaces the letter A.

The first management unit 14A is associated in a bijective manner with a first identifier Id1. Thus, the first identifier Id1 of the first management unit 14A is unique for the management unit 14A, 14B considered.

Stated otherwise, the second management unit 14B is associated with a first identifier Id1 which is different from the first identifier Id1 of the first management unit 14A.

The first identifier Id1 is, for example, a MAC (Media Access Control) address, also called a physical address.

The first management unit 14A is linked to the electrical installation 12A by a first electrical conductor 22A.

The first management unit 14A is linked to the first communication gateway 16A by another electrical conductor 24A.

The first management unit 14A belongs to a first local communication network R1A.

The first local network R1A is a computer network such that the terminals which belong to the local network have frames dispatched at the level of the link layer without using Internet access. The first local network R1A is, for example, a LAN network (Local Area Network).

The relay platform 18 belongs to a global communication network R2.

The global communication network R2 is the Internet network. The global network R2 differs from the first local network R1A, in the sense that the global network R2 covers a greater geographical area than the first local network R1A. The global network R2 is, for example, a WAN network (Wide Area Network).

The first management unit 14A comprises a first memory 26A, a first recovery unit 28A and a first communication unit 30A.

The first memory 26A is able to store data such as the first identifier Id1 of the first management unit 14A.

The first recovery unit 28A is configured to recover the data DA relating to the electrical installation 12A, which are then stored in the first memory 26A.

The data DA relating to the electrical installation 12A comprise, for example, values of electrical consumption of the electrical installation 12A.

The first recovery unit 28A comprises, for example, a sensor for measuring the electrical consumption of the electrical installation 12A.

As a variant, the data DA relating to the electrical installation 12A also comprise, for example, operating state variables of the electrical equipment of the electrical installation 12A and/or parametrization variables of the electrical equipment.

The first communication unit 30A is configured to exchange with the relay platform 18, a first frame TA comprising the data DA recovered by the first recovery unit 24A and a second identifier Id2, on the global network R2, of the communication gateway 16A through which the first frame TA travels.

Stated otherwise, the first frame TA comprises, when it is received by the relay platform 18, a header comprising the second identifier Id2 of the first communication gateway 16A and a data set comprising the data DA relating to the electrical installation 12A and recovered by the first recovery unit 28A.

Indeed, when the first frame TA journeys from the management unit 14A to the relay platform 18, the communication gateway 16A is able to modify the header of the frame so as to incorporate therein the second identifier Id2 of the first communication gateway 16A.

Advantageously, the first frame TA comprises the first identifier Id1 of the first management unit 14A exchanging the first frame TA. Stated otherwise, advantageously, the data set also comprises the first identifier Id1 of the first management unit 14A.

Advantageously still, the first frame TA also comprises a global identifier I2, on the global network R2, of the relay platform 18.

The first communication gateway 16A forms a communication interface between the first local network R1A and the global network R2.

The first communication gateway 16A links the relay platform 18 and the first management unit 14A.

The first communication gateway 16A comprises a first local communication port 31A linked to the local network R1A and a first global communication port 32A linked to the global network R2.

The first communication gateway 16A is associated with a second identifier Id2, on the global network R2, of the first communication gateway 16A, as well as with a local identifier of the first communication gateway 16A on the local network R1A.

The first communication gateway 16A is, for example, a router.

The first communication gateway 16A comprises a first routing unit 33A for the messages, also called frames or packets, received by the first communication gateway 16A, on the first communication ports, local 31A and global 32A. The first routing unit 33A is able to store, for example, a routing table.

The routing unit 33A is configured to transmit the frame TA to the global network R2. More precisely, the routing table associates with the global identifier I2 of the relay platform 18, the first global communication port 32A.

The relay platform 18 comprises a computing device comprising a processor 34 and an information medium 36 storing programming code instructions.

The relay platform 18 also comprises a communication element 38.

The relay platform 18 is associated with the global identifier I2. Stated otherwise, the relay platform has as identifier on the global network R2, the global identifier I2.

The processor 34 is able to execute the programming code instructions stored by the information medium 36.

The programming code instructions stored by the information medium 36 form a computer program 37 able to be executed or implemented by a computer. The computer corresponds, for example, to the processor 34.

The computer program 37 is able, when it is executed, to store data, such as the data DA, DB relating to each electrical installation 12A, 12B, exchanged via each frame TA, TB, the second identifier Id2 of the communication gateway 16A, 16B through which each frame TA, TB travels, and the first identifier Id1 of the management unit 14A, 14B that transmitted each frame TA, TB.

The computer program 37 is also able, when it is executed, to process a request M1, for access to the data relating to the electrical installations 12A and 12B exchanged with the first 14A and second 14B management units, sent by the communication terminal 20. The computer program 37 is in particular configured to authorize or otherwise the communication terminal 20 to access the data DA, DB relating to the electrical installations 12A, 12B.

The communication element 38 is configured to communicate with the first 24A and second 24B management units and in particular with the first 26A and second 26B communication units so as to recover each frame TA, TB.

The communication element 38 is also configured to communicate with the communication terminal 20 so as to receive the access request M1, but also to transmit to the communication terminal 20 the data DA, DB required via the access request M1, when access to the data DA, DB is authorized.

The communication terminal 20 is configured to communicate with the relay platform 18.

The communication terminal 20 is able to be connected to one of the first R1A and second R1B local networks and/or to the global network R2.

More precisely, the communication terminal 20 is configured to communicate to the relay platform 18 the request M1 for access to the data DA and DB relating to the electrical installations 12A and 12B, exchanged by one of the first 14A and second 14B management units with the relay platform 18. The access request M1 comprises an access parameter P which depends on the first identifier Id1 of the management unit 14A, 14B and a third identifier Id3, on the global network R2, of an element belonging to the global network R2 and being the originator of the transmission of the access request M1 on the global network R2.

When the communication terminal 20 is connected to the first local network R1A, the access request M1 is transmitted to the first communication gateway 16A which then sends the access request M1 on the first global communication port 32A, destined for the relay platform 18.

When the communication terminal 20 is connected to the global network R2, the access request M1 is transmitted directly on the global network R2, destined for the relay platform 18, since in this configuration the communication terminal 20 belongs to the global network R2.

The communication terminal 20 comprises a storage facility 40, and a communication unit 42.

The storage facility 40 is able to store data. The data are generally specific to one of the management units 14A, 14B, and are such that, the access parameter P dependent on the first identifier Id1 of one of the first 14A and second 14B management units. The access parameter P is, for example, a password associated, at the level of the relay platform 18, with the first identifier Id1 of one of the management units 14A, 14B.

Advantageously, the storage facility 40 is able to store additional data, such as a local identifier of the communication terminal 20, on the first R1A or second R1B local network, when the communication terminal 20 is connected to one of the first R1A and second R1B local networks R1A, R1B and able to transmit the access request M1 on the local network R1A, R1B.

Likewise, the storage facility 40 is able to store additional data, such as a global identifier of the communication terminal 20 on the global network R2, when the communication terminal 20 is connected to the global network R2 and able to transmit the access request M1 on the global network R2.

The communication unit 44 is able to communicate to the relay platform 18 the request M1 for access to the data DA, DB exchanged by the relay platform 18 with one of the first 14A and second 14B management units. The access request M1 comprises the access parameter P and the third identifier Id3.

As mentioned hereinabove, the third identifier Id3 is the identifier of the communication terminal 20 on the global network R2, when the communication terminal is connected only to the global network R2 and able to transmit the access request M1 on the global network R2.

Moreover, the third identifier Id3 is, when the communication terminal 20 is connected to one of the first R1A and second R1B local networks, the second identifier of the communication gateway 16A, 16B effecting the interface between the local network R1A, R1B and the relay platform 18.

The second identifiers Id2 of the first 16A and second 16B communication gateways, as well as the third identifier are, for example, IP addresses.

A first mode of operation of the system 10 and in particular of the relay platform 18 will subsequently be presented, by virtue of the implementation of the data access control method presented in FIGS. 2 and 3.

Figure 2:
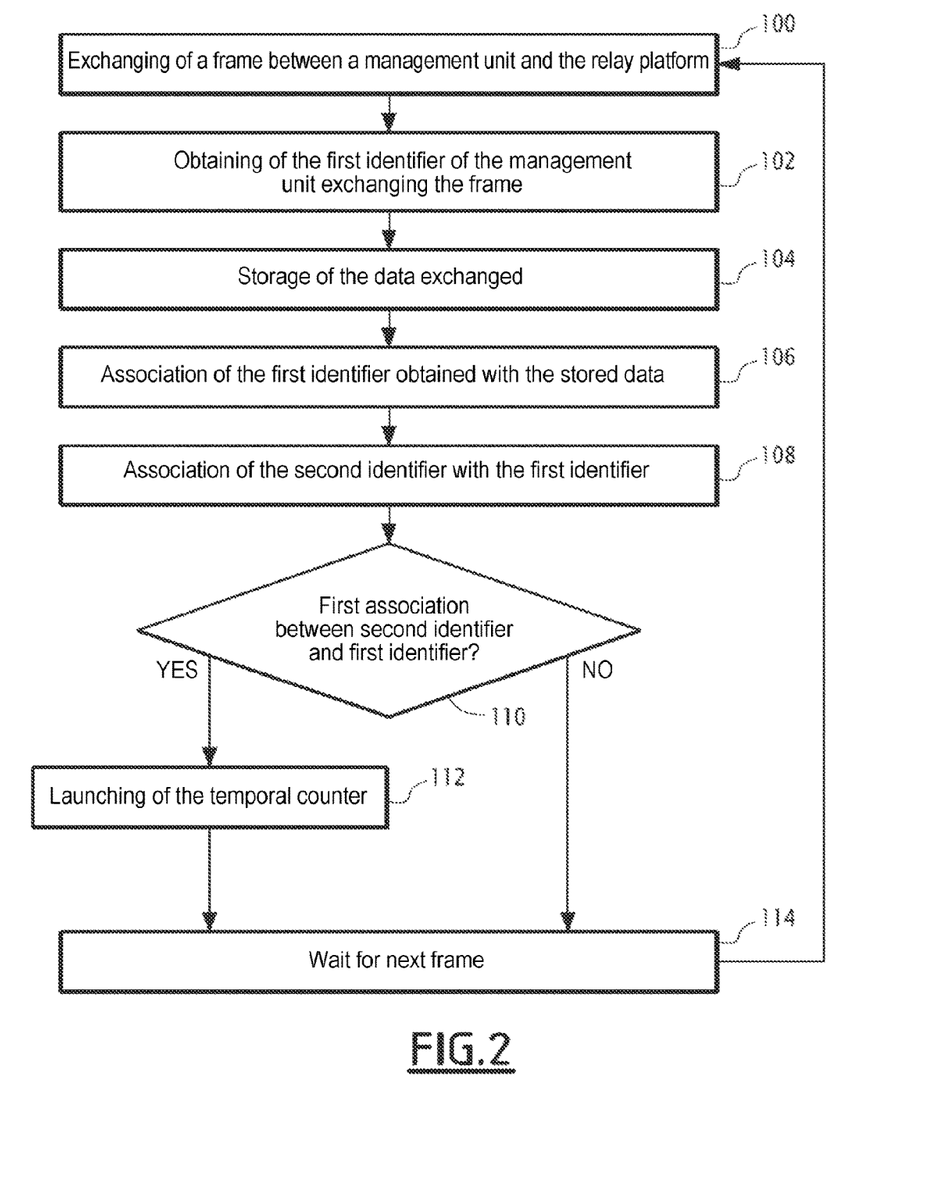
FIG. 2 is a flowchart of an exemplary implementation of a method for controlling access to data by the system of FIG. 1, as regards the exchanges of data between the management units and the relay platform.

FIG. 2 presents the method for controlling access to data by the system 10, as regards the exchanges of data between the first management unit 14A and the relay platform 18.

Figure 3:
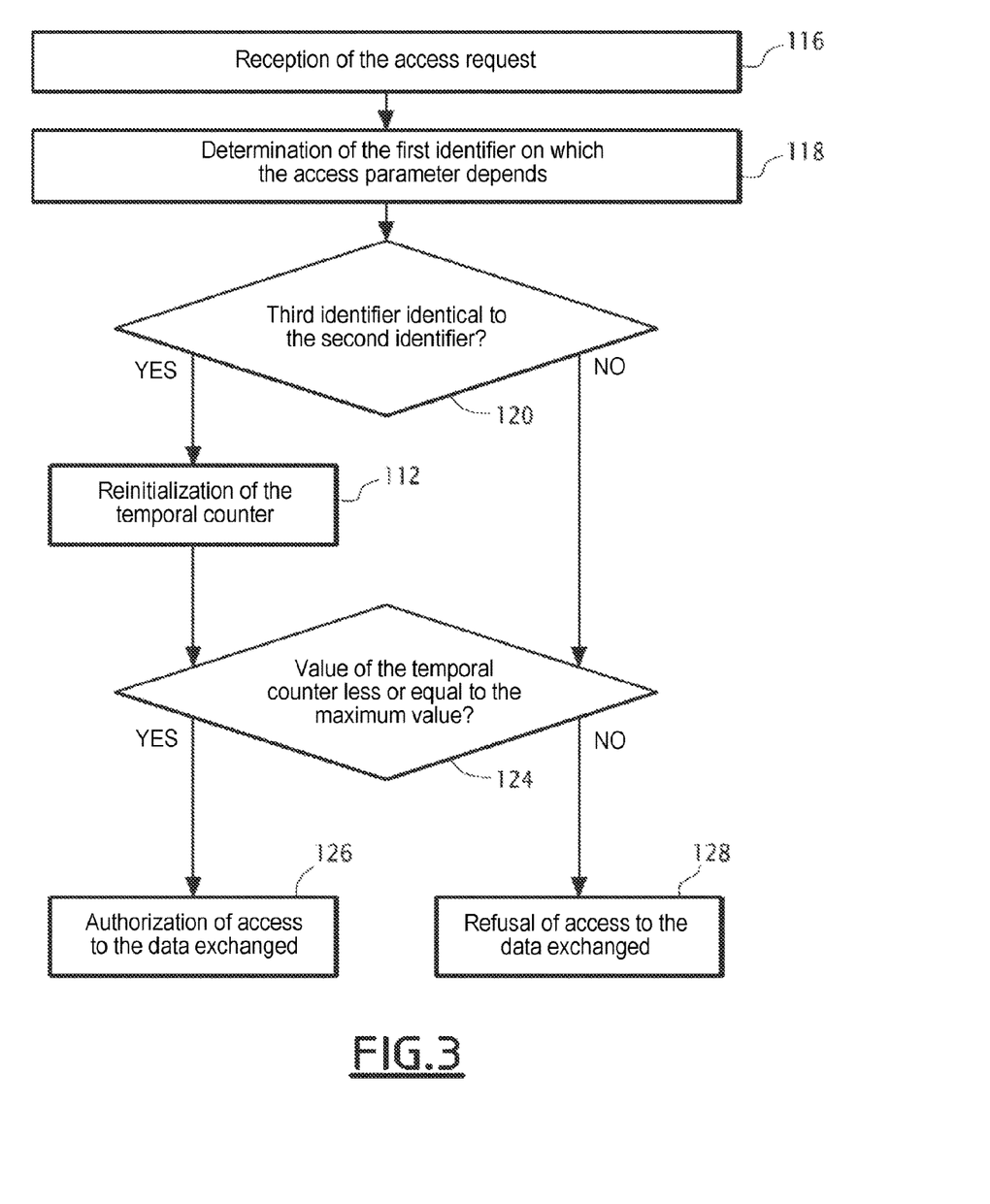
FIG. 3 is a flowchart of an exemplary implementation of a method for controlling access to data by the system of FIG. 1, as regards the processing of a request to access the data received by the relay platform.

FIG. 3 presents the method for controlling access to data by the system 10, as regards the processing of a request M1 to access the data received by the relay platform 18.

Hereinafter in the presentation of the control method, to simplify the description, the control method is presented in the case where only the first management unit 14A transmits the first frame TA to the relay platform 18 and where the relay platform 18 receives a request M1 to access the data DA exchanged with the management unit 14A.

The method applies to a plurality of management units 14A, 14B, which transmit a plurality of frames TA, TB to the relay platform 18 and also to one or more communication terminals, which transmit one or more requests M1 for access to the data exchanged by various management units 14A, 14B with the relay platform 18.

The control method described hereinafter is implemented when the computer program 37 is executed by the processor 34.

During an initial exchanging step 100, the management unit 14A exchanges the first frame TA, such as described hereinabove, with the relay platform 18. In the course of the exchanging step 100, the relay platform 18 detects the reception of the first frame TA and is thus able to access the data DA relating to the electrical installation 12A, the second identifier Id2 of the first communication gateway 16A through which the first frame TA travels and the first identifier Id1 of the first management unit 14A.

The first management unit 14A exchanges, for example, regularly, with a predetermined period, the first frame TA with the relay platform 18.

Advantageously, subsequent to the exchanging step 100, the data DA exchanged relating to the electrical installation 12A are deleted from the first memory 26A.

During an obtaining step 102, the first identifier Id1 of the first management unit 14A exchanging the first frame TA is recovered in the first frame TA. Indeed, in the case presented, where the first frame TA comprises the first identifier Id1 of the first management unit 14A, it suffices to extract the first identifier Id1 of the frame TA. The first identifier Id1 is, for example, in a predetermined position in the first frame TA. The first management unit 14A that transmitted the first frame TA is then identified by the relay platform 18.

Thereafter, during a storage step 104, the information medium 36 stores the data DA relating to the electrical installation 12A included in the first frame TA exchanged. The relay platform 18 is then able to authorize access or otherwise, for the communication terminal 20, to the stored data DA.

Advantageously, during the storage step 104, the information medium 36 stores the first identifier Id1 obtained in the obtaining step 102 and the second identifier Id2 included in the first frame TA.

During a first associating step 106, the first identifier obtained with the obtaining step 102 is associated with the data DA stored in step 104. Thus, the communication terminal 20 is able to request access to the data stored on the basis of the knowledge of the first identifier Id1 or, more generally, of the access parameter P relating to the first identifier Id1.

During the first associating step 106, the information medium 36 stores, for example, an association table which comprises the data DA relating to the electrical installation 12A and received via the first frame TA, with which is associated the first identifier Id1 of the management unit 14A that transmitted these data.

During a second associating step 108, the second identifier Id2, included in the first frame TA, of the first communication gateway 16A is associated with the first identifier Id1 obtained during the obtaining step 102.

Advantageously, during the second associating step 108 a unique second identifier Id2 is associated with each first different identifier Id1. The unique second identifier Id2 is the second identifier which is included in the first frame TA most recently exchanged by the management unit having the first identifier obtained.

Thereafter, in the course of an identification step 110, the relay platform 18 identifies whether during the second associating step 108, this is the first time that a second communication gateway identifier is associated with the first identifier Id1 obtained. A counting variable is, for example, associated with each first identifier during the second associating step 108 and is incremented at each iteration of the second associating step 108 for the said first identifier.

During the identification step 110, the processor analyses, for example, whether the counting variable associated with the first identifier Id1 obtained is greater than 1, in the example where the counting variable is initially fixed at 0 and incremented by 1 at each iteration of the second associating step for the first identifier obtained.

In the case where during the identification step 110, it is determined that this is the first iteration of the second associating step 108 for the first identifier Id1 obtained, the method comprises subsequent to the identification step 110, a launching step 112 in the course of which a first temporal counter CTA is launched for the management unit 14A having the first identifier Id1 obtained. Stated otherwise, the launching step 112 is carried out just once for the first management unit 14A, subsequent to the first iteration of the associating step 108 for the first management unit 14A and therefore in particular subsequent to the first iteration of the exchanging step 100.

The launching step 112 is carried out from a different reference instant for each management unit 14A, 14B, which corresponds, in our case, to an instant of identification of a first association of the first identifier Id1 obtained with a second identifier Id2.

Next, subsequent to the launching step 112, a step 114 of waiting for the next frame TA, TB by the relay platform 18 is executed. During the waiting step 114, the relay platform 18 waits for one of the management units 14A, 14B to exchange a frame TA, TB with the relay platform so as to execute the method of FIG. 2.

In the converse case, subsequent to the identification step 110, the waiting step 114 is carried out directly.

FIG. 3 presents the operation of the control method subsequent to the reception of the request M1 for access to the data DA exchanged between the first management unit 14A and the relay platform 18.

During a reception step 116, the relay platform 18 detects the reception of the request M1 for access to the data DA exchanged with the management unit 14A. The access request M1 originates from the communication terminal 20 and comprises the access parameter P dependent on the first identifier Id1 of the first management unit 14A and the third identifier, on the global network R2, of the element belonging to the global network R2 and being the originator of the transmission of the request M1 on the global network R2.

More precisely, the request M1 comprises, on the one hand, a header, in which the third identifier is included, and, on the other hand, a data set comprising the access parameter P dependent on the first identifier Id1 of the first management unit 14A.

Subsequent to the reception step 116, the relay platform 18 has the information necessary for the identification of the data DA exchanged to which the communication terminal 20 requests access.

Thereafter, during a determining step 118, the relay platform 18 determines the first identifier Id1 on which the access parameter P included in the request M1 received depends. The information medium 36 stores, for example, an association table associating a different access parameter P with each first identifier Id1. Thus, during the determining step 118, the first identifier corresponding to the access parameters P received is searched for in the association table.

Subsequent to the determining step 118, the relay platform 18 is able to determine the first identifier Id1 of the management unit 14A, 14B which exchanges the data DA, DB, that a user of the communication terminal 20 wishes to recover.

During a comparison step 120, the relay platform 18, and in particular the processor 34, compares the third identifier Id3 included in the access request M1 with the second associated identifier Id2, in the association table, with the first identifier Id1 determined in the determining step 118. Stated otherwise, the third identifier Id3 is compared with the second identifier Id2 included in the most recent frame TA, TB exchanged by the management unit 14A having the first identifier determined in the determining step 118. More precisely, during the comparison step 120, the processor 34 determines whether the third identifier Id3 included in the request M1 is identical to the second identifier Id2 associated, in the association table, with the first determined identifier Id1.

Just as subsequent to the comparison step 120, the method comprises, when it is determined in the comparison step 120 that the third identifier Id3 is identical to the second identifier Id2, a step 122 of reinitializing, to a predetermined initial value V1, the first temporal counter CTA of the management unit 14A having the first identifier Id1 determined in step 118. The first temporal counter CTA then recommences at the predetermined initial value V1. The initial value V1 is, for example, equal to 0 seconds.

Thus, when the communication terminal 20 and the management unit 14A transmitting the data DA to which the communication terminal 20 wishes to have access have the same identifier on the global network R2, that is to say the same IP address, the first temporal counter CTA is reinitialized.

Stated otherwise, when the third identifier of the element originating the transmission of the request on the global network R2 is identical to the second identifier Id2 of the first communication gateway 16A through which the data DA to which the user of the communication terminal 20 wishes to have access travel, the first temporal counter CTA is reinitialized. Indeed, in this case, the communication terminal 20 is connected to the first local network R1A and the access request M1 and the first frame TA pass through the first communication gateway 16A. The first communication gateway 16A then modifies the header of the access request M1 and of the first frame TA, so as to incorporate therein the second identifier Id2 of the first communication gateway 16A, so that in the access request M1 the third identifier Id3 is equal to the identifier Id2 of the first communication gateway 16A.

Subsequent to the reinitialization step 122, during a second comparison step 124, the value of the first temporal counter CTA is compared with a predetermined maximum value V2. More precisely, during the second comparison step 124, the processor 34 determines whether the value of the first temporal counter CTA is less than or equal to the maximum value V2.

The maximum value V2 is, for example, equal to 500 hours.

More generally, the initial value V1 is strictly less than the maximum value V2.

In the converse case, subsequent to the comparison step 120, the second comparison step 124 is executed directly.

Moreover, if during the second comparison step 124, the value of the first temporal counter CTA is less than or equal to the predetermined maximum value V2, the method comprises subsequent to the comparison step 124, a step 126 of authorizing, for the communication terminal that sent the access request M1, access to the stored data DA, associated with the first identifier Id1 determined in the determining step 118. A message comprising the stored data DA, associated with the first identifier Id1 determined, is, for example, transmitted by the relay platform 18 to the communication terminal 20.

Stated otherwise, access to the data DA included in each frame TA exchanged by the management unit 14A having the first determined identifier Id1 is authorized, if the value of the temporal counter CTA, CTB of the management unit having the first determined identifier Id1 is less than or equal to the predetermined maximum value V2.

In the converse case, the method comprises, subsequent to the second comparison step 124, a step 128 of refusing access to the stored data DA associated with the first determined identifier. A message refusing access is, for example, transmitted by the relay platform 18 to the communication terminal 20. As a variant, an explanatory message is, for example, transmitted by the relay platform 18 to the communication terminal 20. The explanatory message indicates, for example, that the communication terminal 20 must be connected to the local network R1A to which the management unit 14A that transmitted the stored data DA belongs, so as to be authorized to have access to the stored data DA.

In the control method and the control system that were described previously, the fact of using a temporal counter CTA, CTB reinitialized as a function of the comparison of the third identifier with the second identifier, makes it possible to authorize access to the data DA, DB exchanged between one of the management units 14A, 14B and the relay platform 18 only if the communication terminal 20 connects regularly to the local network to which the management unit 14A, 14B belongs, in order to request access to the data DA, DB exchanged by the management unit 14A, 14B.

Thus, the security of the access to the data DA, DB is improved. Indeed, if the communication terminal 20 no longer has access to the local network R1A, R1B, then access, from the communication terminal 20, to the data DA, DB exchanged will no longer be possible from the moment at which the value of the temporal counter CTA, CTB has reached the maximum value V2. Indeed, the temporal counter CTA, CTB will no longer be reinitialized and access to the data DA, DB exchanged will be refused when the temporal counter has reached the maximum value V2.

As a variant, the control system 10 is configured so that the communication terminal and in particular the user of the communication terminal 20 has access to the data DA, DB exchanged, only when it/he connects to the relay platform 18 via the local network R2. In this variant, no temporal counter is used and access to the data DA, DB exchanged is authorized only when, during the comparison step 120, the third identifier is identical to the second identifier. In this variant, the identification 110, launching 112, reinitialization 122 and comparison 124 steps are not carried out. The authorization 126 and refusal 128 steps are then dependent on the result of the comparison step 120.

According to another variant, subsequent to the authorization step 126, the communication terminal is able to dispatch a request for modification of the data DA, DB exchanged between one of the management units and the relay platform, in particular when the data are, for example, operating state variables of the electrical equipment of the electrical installation 12A and/or parametrizing variables for the electrical equipment. The modification request comprises, for example, modified data and the access parameter. The modified data are, for example, input by the user from an input interface associated with the communication terminal. In this variant, the relay platform 18 then transmits the modified data to the management unit 16A, whose first identifier depends on the access parameter P. The management unit 14A then configures the equipment of the electrical installation 12A as a function of the modified data.

According to another variant, the reinitialization step 122 is not carried out and, during the authorization step 126, access to the data is authorized if the third identifier is identical to the second identifier during the comparison step 120 or if the value of the first temporal counter CTA is less than or equal to the maximum value V2 during the comparison step 124. In the converse case, the refusal step 128 is carried out and access to the data is refused.

According to another variant, the control system 10 comprises one or more than two management units, as well as one or more than two communication gateways associated with one or more than two electrical installations.

The modes of operation and embodiments described hereinabove are able to be combined with one another, totally or partially, to give rise to other embodiments of the invention.

The invention claimed is:

1. A method for controlling access to data relating to at least one electrical installation, exchanged between a respective management device of each electrical installation and a relay platform, the relay platform belonging to a global communication network and each management device belonging to a respective local communication network, each management device having a first respective identifier, each management device being linked to the global communication network by a respective communication gateway having a second identifier on the global communication network, wherein the method comprises:
exchanging at least one frame between each management device and the relay platform, each frame comprising the data and the second identifier of the communication gateway through which the frame travels,
obtaining for each frame exchanged of the first identifier of the management device exchanging the frame,
receiving by the relay platform of a request to access the data exchanged with the or one of the management devices, the request originating from a communication terminal via the respective local communication network and comprising an access parameter dependent on the first identifier of the management device and a third identifier, on the global network, of an element belonging to the global network and being the originator of the transmission of the request on the global network,
determining the first identifier on which the access parameter depends,
comparing the third identifier with the second identifier included in the or at least one of the frames exchanged by the management device having the first determined identifier,
authorizing access, for the communication terminal, to the data included in each frame exchanged by the management device having the first determined identifier, if during the comparison step the second and third identifiers are identical, and
launching a respective temporal counter from a respective reference instant, and in which, during the authorizing step, access to the data included in each frame exchanged by the management device having the first determined identifier is also authorized to the communication terminal, when the value of the temporal counter of the management device having the first determined identifier is less than or equal to a predetermined maximum value,
in which the launching step is carried out just once for each management device and subsequent to the first iteration of the exchanging step for the management device.

2. The method according to claim 1, in which, if during comparing step the second and third identifiers are identical, the method comprises the following step:
reinitializing a predetermined initial value of the temporal counter of the management unit having the first determined identifier, the temporal counter recommencing at the predetermined initial value and the predetermined initial value being strictly less than the maximum value.

3. The method according to claim 1, in which, during the exchanging step, each frame comprises the first identifier of the management device exchanging the frame.

4. The method according to claim 1, in which, during the comparing step, only the second identifier included in the most recent frame exchanged by the management device having the first determined identifier, is compared with the third identifier.

5. The method according to claim 1, in which, subsequent to the exchanging step, the method comprises for each frame the following steps:
storing the data exchanged,
associating the first identifier of the management device exchanging the frame with the stored data,
and, in which, during the authorization step, the data to which access is authorized are the stored data associated with the first determined identifier.

6. The method according to claim 1, in which each first identifier is a MAC address and each second and third identifier is an IP address.

7. A non-transitory computer readable medium comprising software instructions, the software instructions implementing a method according to claim 1, when the software instructions are executed by a computer.

8. A relay platform for controlling access to data relating to at least one electrical installation, exchanged between a respective management device of each electrical installation and a relay platform, the relay platform belonging to a global communication network and each management device belonging to a respective local communication network, each management device having a first respective identifier, each management device being linked to the global communication network by a respective communication gateway having a second identifier on the global communication network, wherein the relay platform comprises:

processing circuitry configured to exchange at least one frame with the management device, each frame comprising the data and the second identifier of the communication gateway through which the frame travels, obtain for each frame exchanged of the first identifier of the management device exchanging the frame, receive a request to access the data exchanged with the or one of the management devices, the request originating from a communication terminal via the respective local communication network and comprising an access parameter dependent on the first identifier of the management device and a third identifier, on the global network, of an element belonging to the global network and being the originator of the transmission of the request on the global network, determine the first identifier on which the access parameter depends, compare the third identifier with the second identifier included in the or at least one of the frames exchanged by the management device having the first determined identifier, authorize access, for the communication terminal, to the data included in each frame exchanged by the management device having the first determined identifier, if during the comparison step the second and third identifiers are identical, and launch a respective temporal counter from a respective reference instant, wherein access to the data included in each frame exchanged by the management device having the first determined identifier is also authorized to the communication terminal, when the value of the temporal counter of the management device having the first determined identifier is less than or equal to a predetermined maximum value, in which the respective temporal counter is launched just once for each management device and subsequent to the first iteration of exchanging the at least one frame with the management device.

* * * * *